(12) United States Patent
Samler

(10) Patent No.: US 7,259,348 B2
(45) Date of Patent: *Aug. 21, 2007

(54) WELDING TORCH HAVING INTEGRAL GAS LENS AND COLLET AND METHOD OF OPERATING SAME

(75) Inventor: Gary R. Samler, Holmes Beach, FL (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/244,302

(22) Filed: Sep. 16, 2002

(65) Prior Publication Data

US 2004/0050823 A1   Mar. 18, 2004

(51) Int. Cl.
*B23K 9/24* (2006.01)
(52) U.S. Cl. .......................... 219/75; 219/138
(58) Field of Classification Search .................. 219/74, 219/75, 137.31, 137.42, 138
See application file for complete search history.

(56) References Cited

U.S. PATENT DOCUMENTS

| | | | | |
|---|---|---|---|---|
| 2,880,302 A | | 3/1959 | Cresswell | .................. 219/74 |
| 4,464,560 A | * | 8/1984 | Church et al. | .......... 219/137.42 |
| 5,556,550 A | | 9/1996 | Fyffe | ............................ 219/75 |
| 5,772,102 A | * | 6/1998 | New et al. | .................... 228/42 |
| 5,844,201 A | * | 12/1998 | Dibacco et al. | ........ 219/137.43 |

FOREIGN PATENT DOCUMENTS

| | | |
|---|---|---|
| EP | 1 458 116 | 4/1974 |
| EP | 0 025 989 A1 | 9/1980 |
| EP | 1 291 112 A1 | 3/2003 |
| GB | 777374 | 6/1957 |

\* cited by examiner

*Primary Examiner*—Len Tran
(74) *Attorney, Agent, or Firm*—Fletcher Yoder

(57) ABSTRACT

A welding torch member for securing an electrode to a welding torch is provided. The welding torch member may be adapted to capture the electrode and to enable gas to flow through the welding torch member. The welding torch member may be adapted with a first portion and a second portion. The first portion may be adapted to secure the welding torch member to the welding torch. The second portion may be adapted to be compressed onto the electrode to secure the electrode to the welding torch. The welding torch may have a second welding torch member to compress the second portion onto the electrode. A power source may be used to provide power to the electrode through the welding torch member.

43 Claims, 4 Drawing Sheets

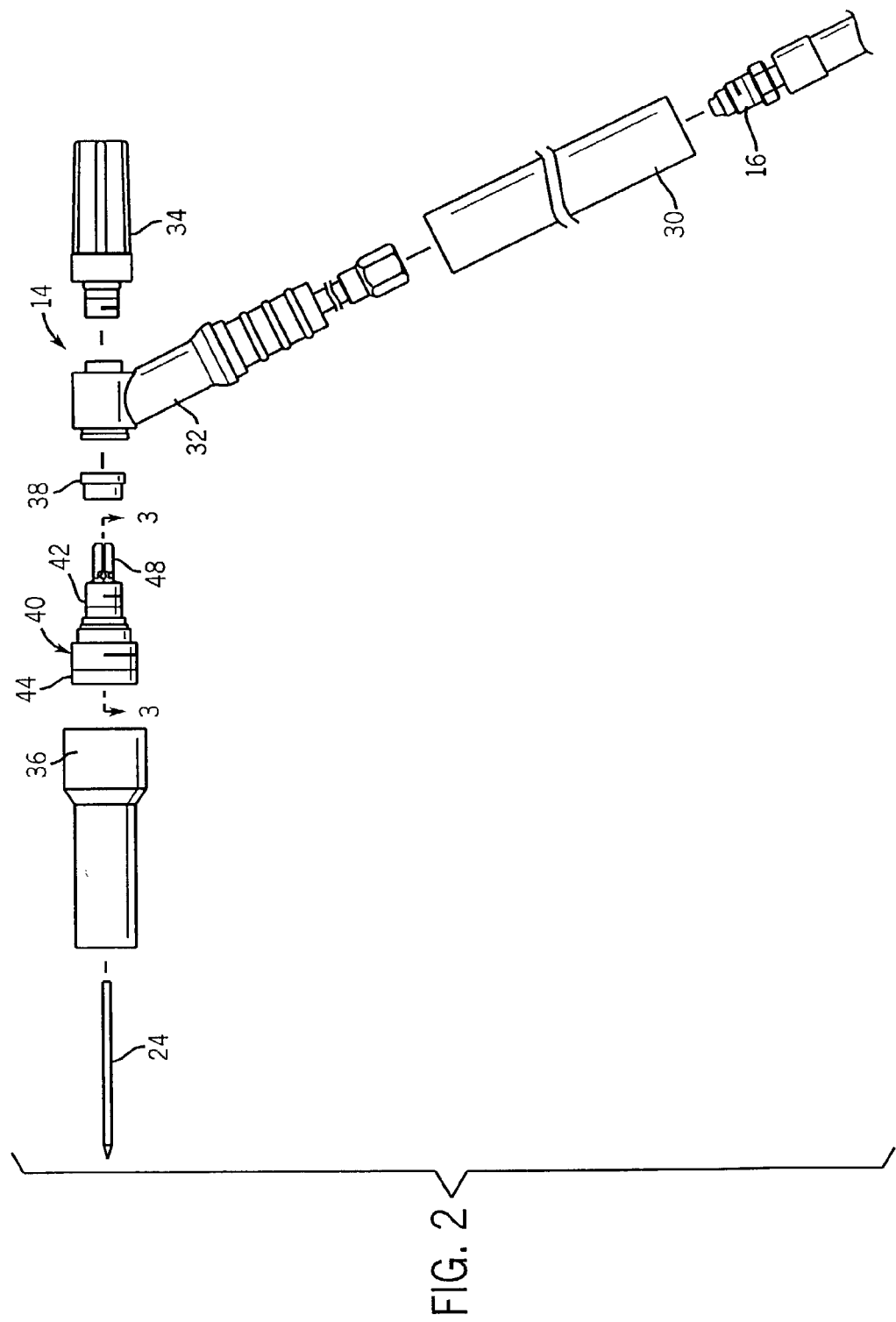

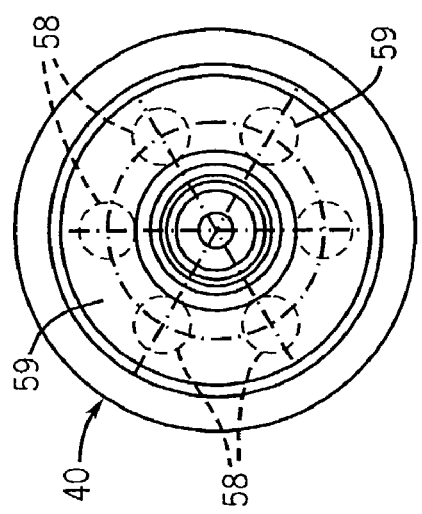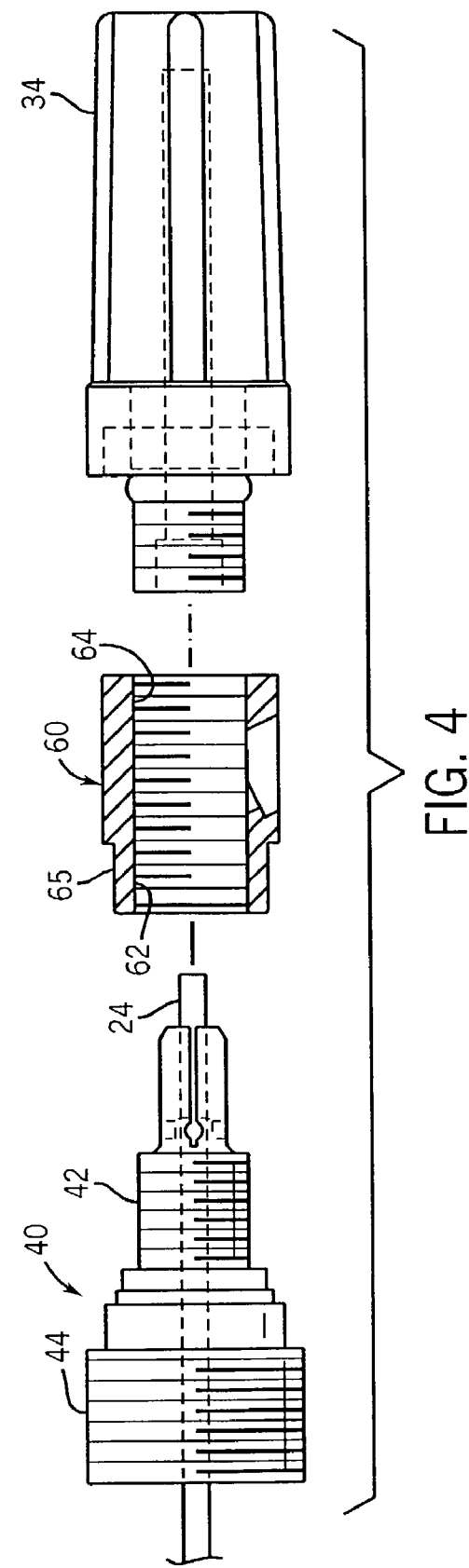

US 7,259,348 B2

WELDING TORCH HAVING INTEGRAL GAS LENS AND COLLET AND METHOD OF OPERATING SAME

BACKGROUND OF THE INVENTION

The present invention relates generally to the field of arc welding systems, and more particularly to an arc welding torch adapted to receive a cylindrical metal electrode.

TIG (Tungsten Inert Gas) welding (also known as gas tungsten arc welding, GTAW, or HELIARC) is a type of arc welding process in which an electric arc is maintained between a cylindrical metal electrode and a metal object. The heat generated by the arc produces localized melting of the metal object. The electrode, typically tungsten, is secured to a torch to enable a user to direct the electrode and establish the point of contact between the electrode and the object. TIG welding may be performed with or without the addition of a filler metal. Typically, the weld puddle and the area surrounding the weld puddle are protected from the atmosphere by an inert gas. The inert gas prevents rapid oxidation of the weld and the surrounding metal.

The electricity for the welding process is provided by a power source through a welding cable coupled to the torch. Typically, the power source is a constant voltage AC, DC, or a combination AC/DC source. In addition, a TIG welding cable typically is adapted to transport the inert gas to the torch. Furthermore, the TIG welding process typically generates a substantial amount of heat in the electrode. Consequently, cooling fluid may be used to cool the torch. Thus, a welding cable for a TIG welding system may transport electricity, gas, and cooling fluid.

The electrodes used in TIG welding typically are shaped like long, cylindrical, metal rods. A typical TIG welding electrode may be secured to a TIG welding torch by a collet, a backcap, and a gas lens. Gas lenses are adapted to provide better gas flow characteristics than collet bodies, another device used to secure electrodes to a TIG welding torch. Gas lenses typically have screens disposed therein to slow down and smooth the flow of gas flowing through the gas lens. To secure the electrode to the welding torch, the electrode is inserted through the collet and gas lens. The gas lens is threaded into a front portion of a threaded torch head disposed within the torch body. The backcap is threaded onto the rear portion of the torch head. As the backcap is threaded onto the torch head, the backcap drives the collet against the interior of the gas lens. The collet is adapted to pinch down on the electrode as the collet is driven against an interior surface of the gas lens, thereby securing the electrode to the torch. In addition, a typical gas lens is adapted to enable gas to flow through the gas lens. A nozzle may be used to direct the gas from the gas lens to the object to be welded.

There are a number of problems associated with the use of conventional collets and gas lenses to secure an electrode to a welding torch. One problem is that the collet and gas lens may be misaligned during installation of the electrode. The misalignment may result in non-uniform gas flow through the gas lens. In addition, a typical collet is small and may easily be dropped during installation, especially in windy conditions. Furthermore, for each diameter of electrode there is an appropriately sized collet and gas lens. Therefore, both the correct collet and gas lens must be selected by a user for each installation of an electrode, thereby increasing the difficulty of installing electrodes in the welding torch, especially when changing one electrode with an electrode having a different diameter.

A need exists for a technique to enable an electrode to be installed in a welding torch more easily than with a separate collet and gas lens. More specifically, a need exists for a system to enable an electrode to be secured to a welding torch using fewer parts and which does not require multiple parts for each diameter of electrode. In addition, there is a need for a device that secures an electrode to a welding torch and provides consistent shielding gas flow.

SUMMARY OF THE INVENTION

The present technique may solve one or more of the needs outlined above. According to one aspect of the present technique, a welding torch member for securing an electrode to a welding torch is provided. The welding torch member may be adapted to compress against an electrode extending through the welding torch member. The welding torch member also may have at least one gas flow chamber extending through the welding torch member to enable gas to flow through the welding torch member. A second welding torch member may be urged against the first welding torch member to compress the second portion onto the electrode. A power source may be used to provide power to the electrode through the welding torch member.

According to another aspect of the present technique, a method of securing an electrode to a welding torch is provided. The method may comprise securing a gas lens to a welding torch. The method also may comprise disposing an electrode through the gas lens. In addition, the method may comprise securing a backcap to the welding torch and disposing the backcap towards the gas lens to compress the gas lens against the electrode.

BRIEF DESCRIPTION OF THE DRAWINGS

The foregoing and other advantages and features of the invention will become apparent upon reading the following detailed description and upon reference to the drawings in which:

FIG. 2 is an exploded view of a welding torch, according to an exemplary embodiment of the present technique;

FIG. 3A is an end view of the integral gas lens/collet of FIG. 3;

FIG. 4 is an exploded view illustrating the orientation of the integral gas lens/collet and backcap to a threaded portion of the welding torch.

DETAILED DESCRIPTION OF SPECIFIC EMBODIMENTS

Figure 1:
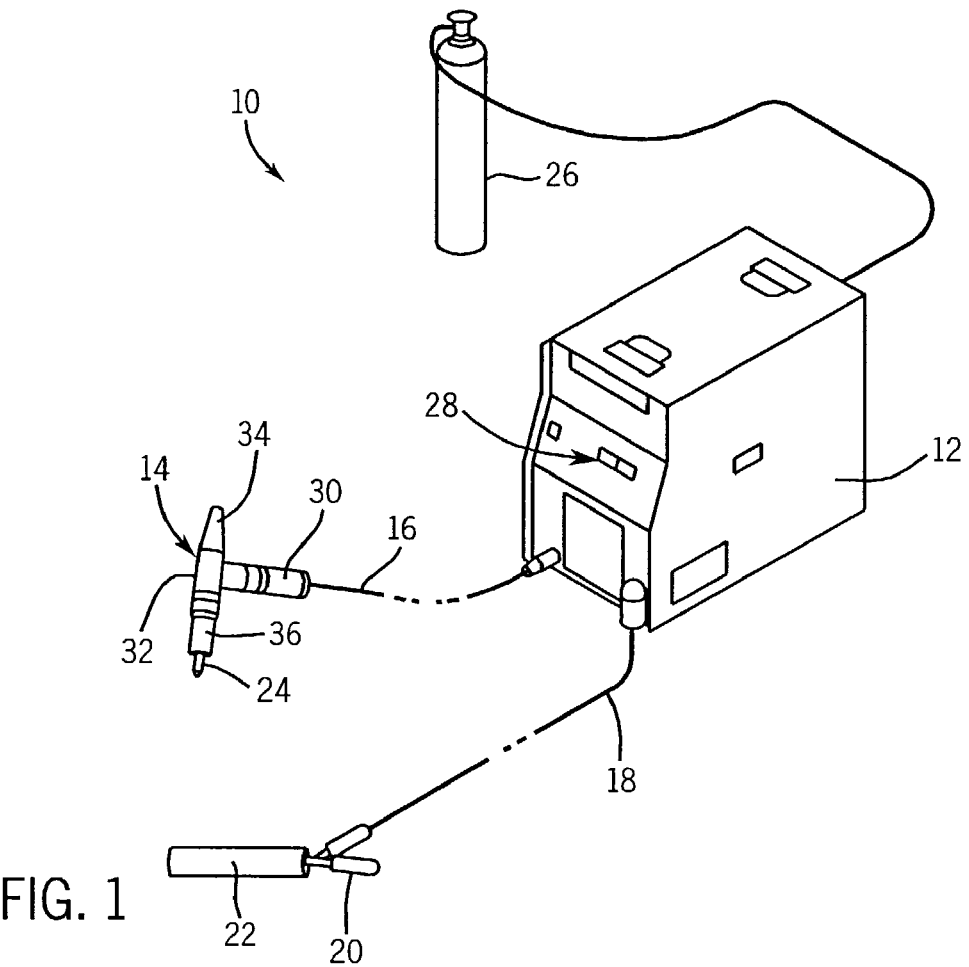
FIG. 1 is a welding system, according to an exemplary embodiment of the present technique.

Referring generally to FIG. 1, a TIG welding system is illustrated, as represented generally by reference numeral 10. However, the present technique may be utilized on other welding systems using cylindrical, metal electrodes. The TIG welding system 10 comprises a power supply 12, a TIG welding torch 14, a welding cable 16, and a return cable 18. The power supply 12 may be a constant voltage AC, DC, a combination AC/DC source, or some other type of power supply. The welding cable 16 electrically couples the welding torch 14 to one terminal of the power supply 12. The return cable 18 is coupled to a second terminal of the power supply 12. In the illustrated embodiment, the return cable 18 has a clamp 20 that is adapted to secure and electrically couple the return cable 18 to a workpiece 22 to be welded. The welding torch 14 is adapted to receive an electrode 24. When the electrode 24 comes in close proximity to or touches the material 22 to be welded, an electric circuit is completed from one terminal of the power supply 12, through the welding cable 16, the electrode 24, the workpiece 22, the work clamp 20, and the return cable 18 to a second terminal of the power supply 12.

In the illustrated embodiment, in addition to electricity, gas from a gas source is coupled to the torch 14. In the illustrated embodiment, the gas source is a gas cylinder 26 coupled to the power supply 12. In the illustrated embodiment, the gas is coupled from the power supply 12 to the torch 14 through the welding cable 16. In this embodiment, the power supply 12 has numerous controls 28 to enable a user to control various operating parameters of the power supply 12, such as the output amperage.

In the illustrated embodiment, the welding torch 14 has a handle 30 that is adapted to receive the welding cable 16. The handle 30 also is adapted to be held by a user to direct the operation of the torch 14. The welding torch 14 also has a torch body 32 that is adapted to hold the electrode 24 and direct the inert gas towards the workpiece 22. In this embodiment, the torch 14 also has a back cap 34 to seal the end of the torch body 32 opposite the electrode 24 so that the gas does not leak out of the torch body 32. Various lengths of back caps may be used to enable the torch body to receive electrodes of various lengths. In addition, a nozzle 36 is secured to the front end of the welding torch 14 to direct gas toward the workpiece 22.

Referring generally to FIG. 2, an exploded view of welding torch 14 is illustrated. In the illustrated embodiment, an insulator 36 is provided for electrical isolation. In addition, an integral gas lens/collet 40 is provided to secure the electrode 24 to the torch body 32. The integral gas lens/collet 40 has a first threaded portion 42 and a second threaded portion 44. The first threaded portion 42 is adapted to secure the integral gas lens/collet 40 to the torch body 32. The second threaded portion 44 is adapted to secure the nozzle 36, or some other member, to the integral gas lens/collet 40. The integral gas lens/collet 40 is secured to the front end of the torch body 32 and the back cap 34 is secured to the rear end of the torch body 32. The torch body 32 enables relative movement between the integral gas lens/collet 40 and the back cap 34. The integral gas lens/collet 40 cooperates with the torch body 32 and back cap 34 to apply a gripping force to the electrode 24. The nozzle 36 is disposed over the integral gas lens/collet 40.

Figure 3:
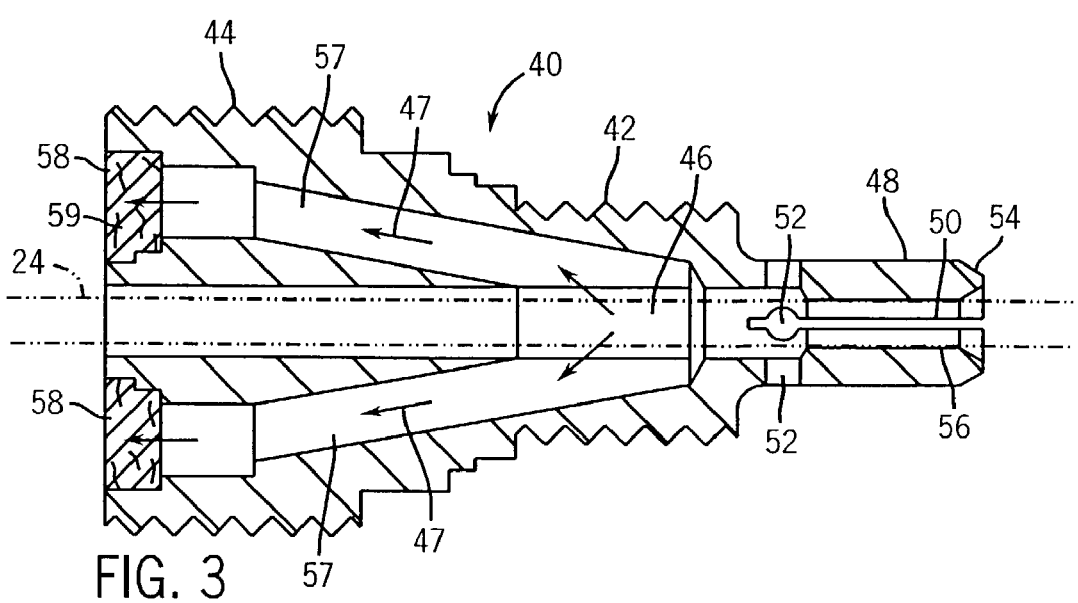
FIG. 3 is an elevational view of an integral gas lens/collet, according to an exemplary embodiment of the present technique.

Referring generally to FIGS. 3 and 3A, the integral gas lens/collet 40 has an internal chamber 46 to enable the electrode 24 to extend through the integral gas lens/collet 40. Gas 47 also flows through a portion of the chamber 46. The integral gas lens/collet 40 has a tubular portion 48, similar to a collet that extends into the torch body 32 when the integral gas lens/collet 40 is secured to the torch body 32. In the illustrated embodiment, the tubular portion 48 of the integral gas lens/collet 40 has four slits 50 located at 90° intervals around the diameter of the tubular portion 48. The slits 50 enable the tubular portion 48 to be compressed. In this embodiment, each slit 50 has an entrance hole 52 for gas to enter the interior of the integral gas lens/collet 40. The tubular portion 48 also has a tapered end surface 54. The tampered end surface 54 is adapted to cooperate with the backcap 34 to compress the tubular portion 48. The tubular portion 48 is adapted with a gripping surface 56 on the interior of the tubular portion 48. The gripping surface 56 is a constriction in the chamber 46 that enables the tubular portion 48 to capture the electrode 24 when the tubular portion 48 is compressed. The entrance holes 52 enable the gas 47 to enter the chamber 46 of the integral gas lens/collet 40 after the gripping surface 56 is squeezed against the electrode 24.

In the illustrated embodiment, the integral gas lens/collet 40 also has six flow chambers 57 that diverge from the internal chamber 46 and lead to six exit holes 58. The flow chambers 57 and exit holes 58 are disposed radially around the electrode 24 as it extends through the center of the integral gas lens/collet 40. In a collet body, gas may have to make several abrupt changes in direction as the gas flows therethrough. However, in the integral gas lens/collet 40, the flow chambers 57 are adapted to diverge from the main chamber 46 at an acute angle, preferably at an angle of approximately 10°. In addition, in the illustrated embodiment, several screens 59 are disposed adjacent to the exit holes 58 to decrease the velocity of the gas 47 exiting the gas lens/collet 40 and, along with the small angle of the flow chambers 57, improve the flow characteristics of the shield gas 47. From the integral gas lens/collet 40, gas 47 flows through the nozzle 36 towards the workpiece 22.

Referring generally to FIG. 4, the torch body 32 has an internally threaded torch head 60. The torch head 60 has a first threaded portion 62 at one end for threading the integral gas lens/collet 40 and a second threaded portion 64 for threading the backcap 34 to the torch head 60. The torch body 32 also has an insulating layer 65 disposed over the torch head 60 and most of the torch body 32 to electrically insulate the torch body 32. In addition, the torch head 60 has a hole 66 to enable gas to flow through the torch body 32. The electrode 24 may be disposed through the integral gas lens/collet 40 either before or after the integral gas lens/collet 40 is secured to the torch head 60. In addition, an electrode 24 and an integral gas lens/collet 40 may be provided together in a kit form with the electrode predisposed through the integral gas lens/collet 40. The integral gas lens/collet 40 may be adapted to use friction between the electrode and integral gas lens/collet 40 to maintain the electrode disposed through the integral gas lens/collet 40.

Figure 5:
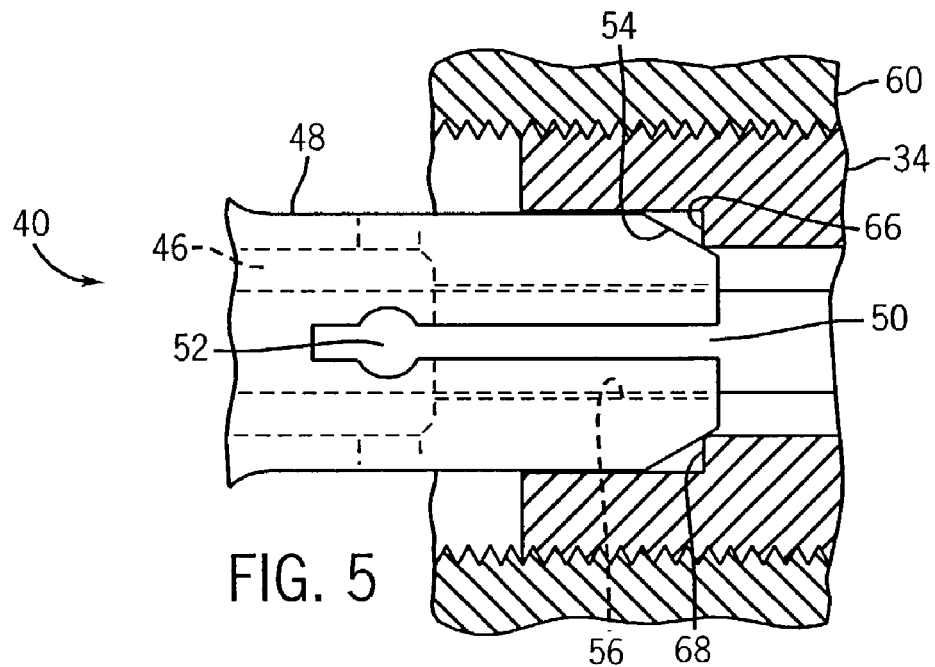
FIGS. 5 and 6 are detailed views illustrating the capture of an electrode by the cooperation of the integral gas lens/collet and backcap, according to an exemplary embodiment of the present technique.
Figure 6:
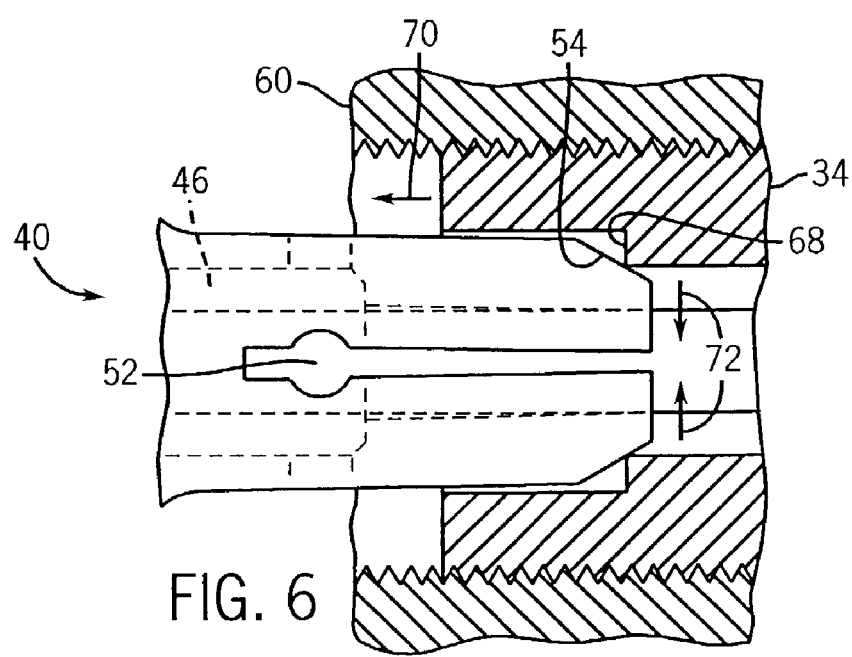

As best illustrated in FIGS. 5 and 6, the backcap 34 and integral gas lens/collet 40 cooperate to secure the electrode 24 to the torch head 60. In the illustrated embodiment, the integral gas lens/collet 40 and electrode 24 are fixed and the backcap 34 is moved toward the integral gas lens/collet 40 to secure the electrode 24. However, the backcap 34 may be fixed and the integral gas lens/collet 40 moved toward the backcap 34 to secure the electrode 24. In the illustrated embodiment, the backcap 34 has a lip 68 that extends around the inner circumference of the backcap 34. As the backcap 34 is rotated clockwise, the backcap 34 is driven towards the integral gas lens/collet 40, as represented by arrow 70. Eventually, the lip 68 contacts the tapered end surface 54 of the integral gas lens/collet 40. As the backcap 34 is driven further towards the integral gas lens/collet 40, the lip 68 of the backcap urges the tapered end surface 54 inward, causing the tubular portion 48 to compress, as represented by the arrows 72. As the tubular portion 48 is compressed, the gripping surface 56 of the integral gas lens/collet 40 is driven against the electrode 24. The friction produced between the gripping surface 56 and the electrode 24 secures the electrode 24 to the integral gas lens/collet 40 and, thus, the torch body 32.

The techniques described above enable an electrode to be installed in a welding torch in a simpler manner and with fewer parts than existing techniques because a separate collet and gas lens are not used. In addition, the techniques provided above enable an electrode to be secured to a welding torch in a more consistent concentric orientation because the portion holding the electrode during assembly, i.e., the integral gas lens/collet, is secured directly to the torch body. The more consistent concentric orientation of the electrode produces a more consistent shielding gas flow through the welding torch. In addition, an electrode and integral gas lens/collet may be pre-packaged to enable a user to quickly replace an electrode and integral gas lens/collet.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. A welding torch member for securing an electrode to a welding torch, comprising:
    a one-piece welding torch member, comprising:
        a first portion adapted to be compressed onto the electrode extending therethrough by abutment with a second welding torch member; and
        at least one gas flow path extending through the one-piece welding torch member to enable gas to flow through the one-piece welding torch member.

2. The welding torch member as recited in claim 1, comprising a second portion adapted to secure the one-piece welding torch member to a welding torch body.

3. The welding torch member as recited in claim 2, comprising a third portion adapted to secure a nozzle to the one-piece welding torch member.

4. The welding torch member as recited in claim 1, further comprising at least one removable screen disposed downstream of the at least one gas flow path.

5. The welding torch member as recited in claim 1, wherein the first portion comprises a plurality of slits extending along the second portion to enable the one-piece welding torch member to compress against the electrode.

6. The welding torch member as recited in claim 1, wherein the first portion comprises a tapered exterior surface adapted to be abut an interior surface of the second welding torch member.

7. The welding torch member as recited in claim 1, comprising a central chamber extending therethrough, the central chamber being adapted to receive the electrode therethrough and to convey gas through a portion of the one-piece welding torch member.

8. The welding torch as recited in claim 7, comprising a plurality of gas flow chambers extending from the central chamber at an acute angle relative to the central chamber.

9. The welding torch member as recited in claim 7, comprising a plurality of entrance holes adapted to enable gas to enter the central chamber from the torch body.

10. The welding torch as recited in claim 9, wherein the plurality of entrance holes are disposed within the first portion.

11. A kit for a welding torch, comprising:
    a welding electrode; and
    a first torch member having a central chamber adapted to receive the welding electrode, the first torch member having a plurality of flow chambers extending through the first torch member, wherein the first torch member is adapted to be compressed against the welding electrode by abutment with a second torch member.

12. The kit as recited in claim 11, wherein the first torch member comprises a threaded portion adapted for threaded engagement with a corresponding threaded portion of the welding torch.

13. The kit as recited in claim 11, wherein the first torch member is adapted to produce friction between the first torch member and the electrode when the electrode is disposed through the central chamber.

14. The kit as recited in claim 11, comprising at least one screen disposed within at least one of the plurality of flow chambers.

15. The kit as recited in claim 11, wherein the plurality of chambers in fluid communication with the central chamber, the first torch member being adapted to be compressed against the welding electrode disposed within the central chamber.

16. The kit as recited in claim 11, wherein the plurality of chambers are disposed radially around the central chamber.

17. The kit as recited in claim 11, wherein each of the plurality of chambers extends outward from the central chamber at an acute angle.

18. The kit as recited in claim 11, wherein the first torch member comprises at least one opening to enable gas to enter the central chamber.

19. The kit as recited in claim 11, wherein the welding electrode is a cylindrical electrode.

20. The kit as recited in claim 19, wherein the welding electrode comprises tungsten.

21. A welding torch, comprising:
    a first torch member securable to the welding torch; and
    a second torch member having a central channel therethrough adapted to receive a welding electrode, the second torch member comprising:
        a first portion adapted to be compressed against the electrode; and
        a passageway through the second torch member to enable gas to flow through the second torch member.

22. The welding torch as recited in claim 21, wherein the second torch member is securable to the welding torch.

23. The welding torch as recited in claim 21, wherein a portion of the channel is adapted to provide a region for gas flow around the electrode.

24. The welding torch as recited in claim 23, wherein the passageway comprises a first opening through the second torch member to enable gas to enter the portion of the channel adapted to provide a region for gas flow around the electrode.

25. The welding torch as recited in claim 23, wherein the passageway comprises a plurality of flow channels extending from the central channel to the exterior of the welding torch member.

26. The welding torch as recited in claim 25, wherein the plurality of flow channels are disposed radially around the electrode.

27. The welding torch as recited in claim 25, wherein the plurality of flow channels are adapted to direct the gas to exit the second torch member at an acute angle relative to the electrode.

28. The welding torch as recited in claim 27, wherein the plurality of flow channels are adapted to direct the gas to exit the second torch member parallel to the electrode.

29. The welding torch as recited in claim 21, wherein the first portion comprises a plurality of slits extending along a portion of the first portion.

30. The welding torch as recited in claim 21, wherein the first portion comprises a constriction in the channel.

31. The welding torch as recited in claim 21, wherein the electrode is cylindrical.

32. A welding system, comprising:
a welding torch, comprising:
a torch body;
a first torch member securable to the torch body, the first torch member being adapted to compressibly capture an electrode extending therethrough and to enable gas to flow through the first torch member; and
a second torch member securable to the torch body, wherein the second torch member is adapted to urge the first torch member into securing engagement with the electrode.

33. The welding system as recited in claim 32, wherein the torch body is adapted to enable the first and second torch members to be displaced axially relative to each other.

34. The welding system as recited in claim 33, wherein the first torch member is adapted to be compressed against the electrode as the first and second torch members are urged into securing engagement.

35. The welding system as recited in claim 32, comprising a source of electric current, wherein the torch body is adapted to couple electric current from the source of electric current to the electrode via the first torch member.

36. The welding system as recited in claim 32, wherein the welding system is a TIG welding system.

37. A welding torch, comprising:
means for securing a first torch member to a welding torch;
means for compressing the first torch member against an electrode disposed therethrough; and
means for enabling gas to flow through the first torch member.

38. A welding torch member for securing an electrode to a welding torch, comprising:
a one-piece welding torch member, comprising:
a first portion adapted to secure the one-piece welding torch member to a torch head of the welding torch;
a second portion adapted to receive the electrode therethrough, wherein the second portion is adapted to be compressed against the electrode to capture the electrode; and
at least one gas flow path extending through the one-piece welding torch member.

39. The welding torch member as recited in claim 38, comprising a third portion adapted to secure a nozzle to the one-piece welding torch member.

40. The welding torch member as recited in claim 38, wherein the first portion is adapted to be compressed against the electrode by abutment with a second welding torch member.

41. The welding torch member as recited in claim 40, wherein the first portion comprises a plurality of slits extending along the second portion to enable the one-piece welding torch member to compress against the electrode.

42. The welding torch member as recited in claim 41, wherein the first portion comprises a tapered exterior surface adapted to be abut an interior surface of the second welding torch member.

43. The welding torch as recited in claim 38, comprising a plurality of gas flow chambers extending from the central chamber at an acute angle relative to the central chamber.

* * * * *